(12) United States Patent
Wu et al.

(10) Patent No.: US 6,510,004 B1
(45) Date of Patent: Jan. 21, 2003

(54) TEMPERATURE INSENSITIVE POLARIZATION FILTER

(75) Inventors: Kuang-Yi Wu, Boulder, CO (US); Jian-Yu Liu, Boulder, CO (US)

(73) Assignee: Chorum Technologies LP, Richardson, TX (US)

( * ) Notice: Subject to any disclaimer, the term of this patent is extended or adjusted under 35 U.S.C. 154(b) by 406 days.

(21) Appl. No.: 09/020,706

(22) Filed: Feb. 9, 1998

Related U.S. Application Data

(60) Provisional application No. 60/038,389, filed on Feb. 14, 1997.

(51) Int. Cl.[7] ............................................. G02B 27/28
(52) U.S. Cl. ....................... 359/498; 359/494; 359/499; 359/500
(58) Field of Search ................................. 359/487, 488, 359/489, 494, 500, 501, 495, 496, 497, 498, 499

(56) References Cited

U.S. PATENT DOCUMENTS

| | | | |
|---|---|---|---|
| 3,529,885 A | * 9/1970 | Ammann | 359/499 |
| 5,612,820 A | * 3/1997 | Schrenk et al. | 359/498 |
| 5,640,516 A | * 6/1997 | Iwatsuka et al. | 359/280 |

FOREIGN PATENT DOCUMENTS

| | | | | |
|---|---|---|---|---|
| RU | 0210419 | * | 2/1968 | 359/498 |
| RU | 1282038 | * | 1/1987 | 359/577 |

OTHER PUBLICATIONS

T. Kimura, et al., "Temperature Compensation of Birefringent Optical Filters", Proc. IEEE vol. 50, No. 8, pp. 1274–1274. Aug. 1971.*

N.M. Drichko, et al., "Thermooptic Compensation of Wide–Angle Controllable Stages of Interference–Type Polarization Filters", Optical Technology, vol. 39, No. 12, pp. 727–729. Dec. 1972.*

* cited by examiner

*Primary Examiner*—John Juba, Jr.
(74) *Attorney, Agent, or Firm*—Baker Botts L.L.P.

(57) ABSTRACT

A temperature insensitive polarization filter is made by inter-digitally stacking two different types of birefringent elements having positive and negative thermal coefficients. This results in a net cancellation of the positive and negative thermal coefficients of the birefringent elements within the filter. The optical retardance of each type of birefringent element changes by an almost equal amount as the operating temperature changes, with one type of element shifting toward a larger optical retardance and the other type of element shifting toward a smaller optical retardance. However, the total retardance remains essentially constant. This assures that the filter can operate over a wide temperature range without shifting its spectral response.

14 Claims, 3 Drawing Sheets

*Fig. 1*
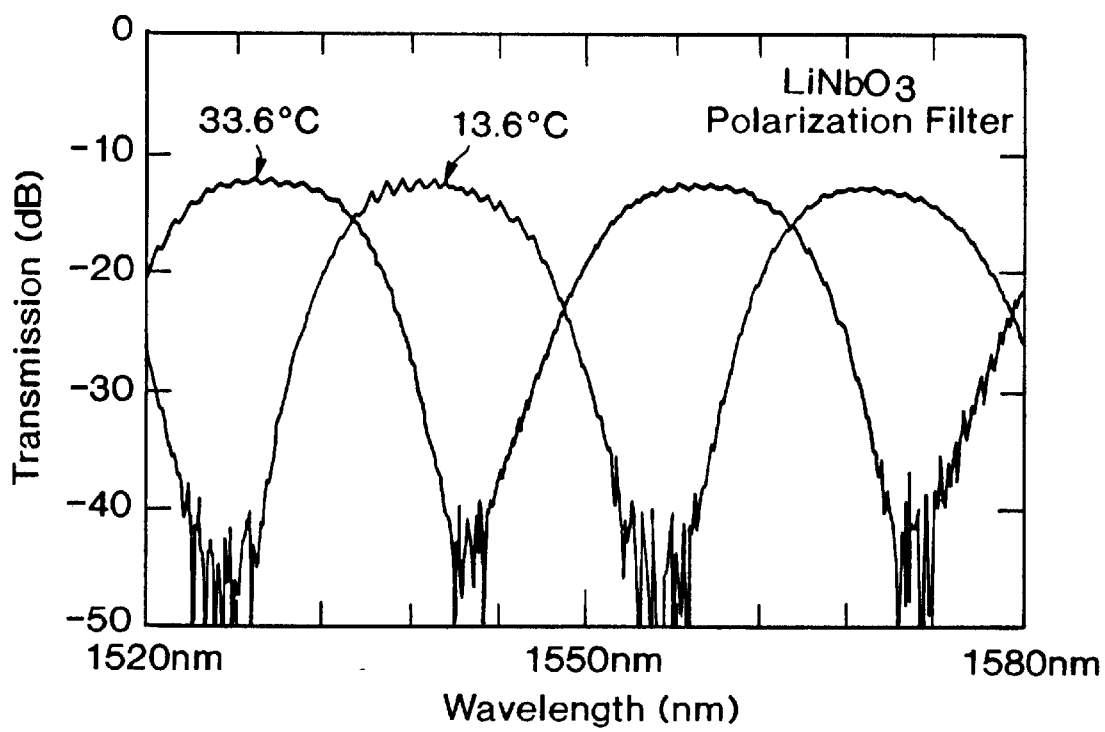
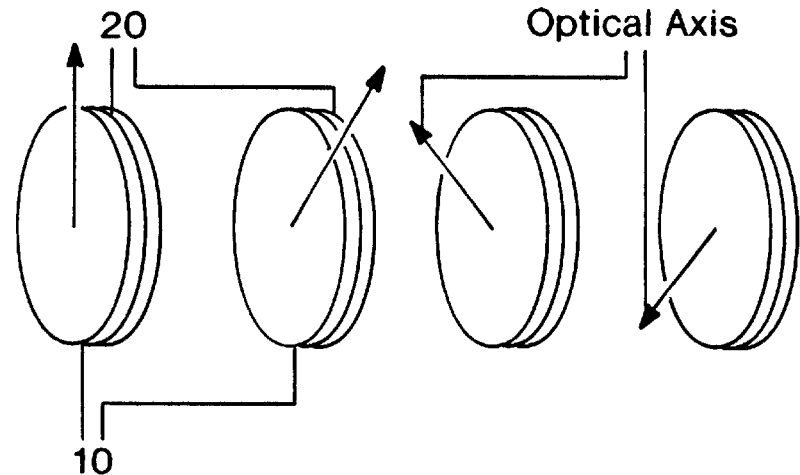
*Fig. 2*

Fig. 3a
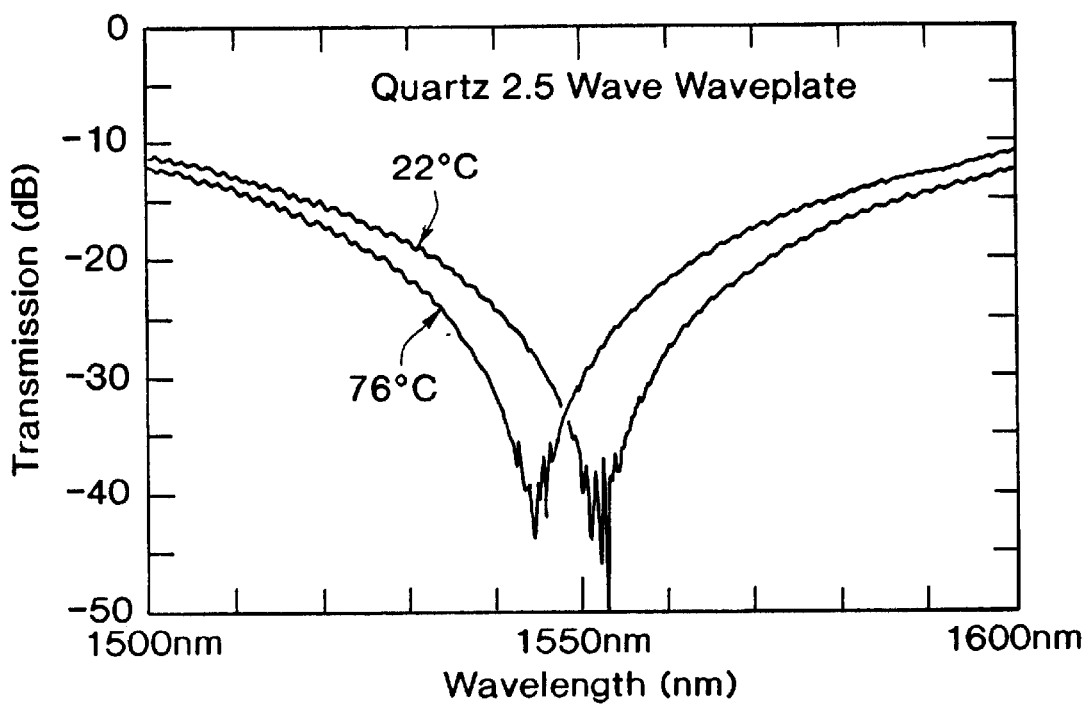
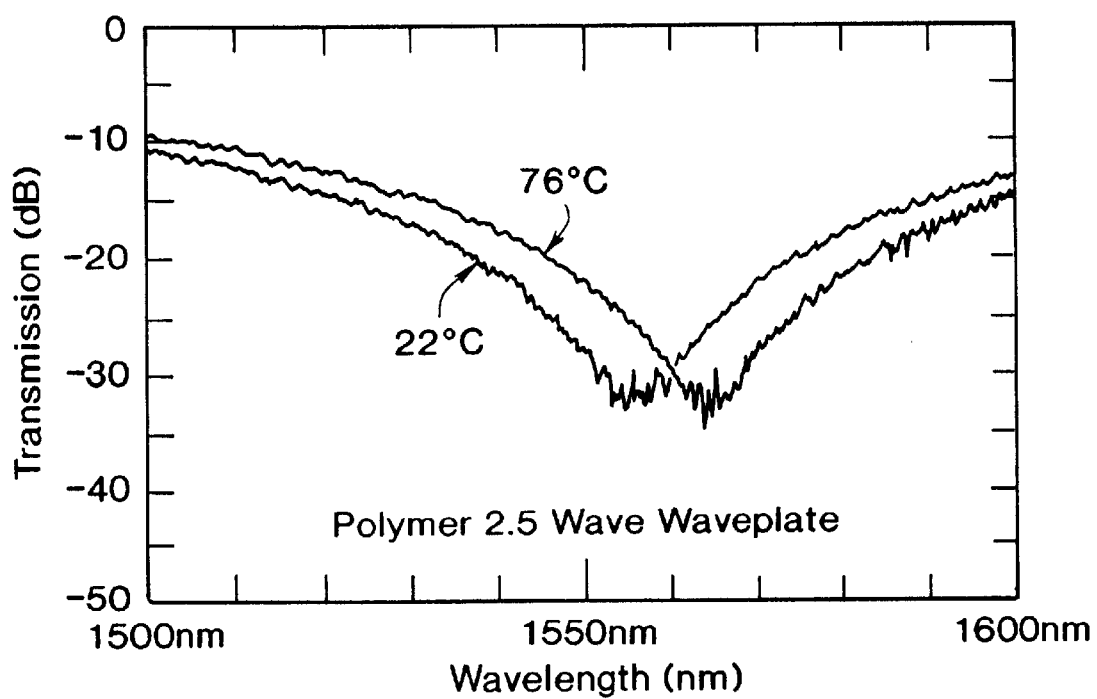
Fig. 3b

TEMPERATURE INSENSITIVE POLARIZATION FILTER

RELATED APPLICATION

This patent application is based on the Applicants' U.S. Provisional Patent Application 60/038,389, entitled "Temperature Insensitive Polarization Filter", filed on Feb. 14, 1997.

GOVERNMENT INTERESTS

The invention was made with Government support under Contract DARPA II: DAAH01-97-C-R308 awarded by U.S. Army Missile Command, AMSMI-AC-CRAY, Redstone Arsenal, AL 35898. The Government has certain rights in the invention.

BACKGROUND OF THE INVENTION

1. Field of the Invention

The present invention relates generally to the field of optical filters. More specifically, the present invention discloses a polarization filter that is insensitive to temperature changes.

2. Statement of the Problem

It is well known that optical birefringent waveplate filters based on crystals are temperature sensitive. This is because the optical retardance, $\Delta nd = (n_e - n_o)d$, of the waveplates varies with temperature, where $n_e$ and $n_o$ are the extraordinary and ordinary refractive indices of the optical material, and d is the thickness of the waveplate. The temperature coefficient of the optical retardance is defined as:

$$\frac{\delta \Delta nd / \Delta nd}{\delta T}$$

For most birefringent waveplates made of crystals, the temperature coefficient of the optical retardance is negative, i.e., when temperature (T) increases the phase retardation of the waveplate decreases due to the decrease in optical birefringence, $\Delta n$. Typically, the temperature coefficient of the optical retardance of a crystal waveplate is on the order of $-1 \times 10^{-4}/°$ C. This change in retardance results a shift in the filter spectrum, because the spectral response of the filter is based on the amount of optical retardation of each of the waveplates in the filter. For example, FIG. 1 illustrates the spectral shift toward shorter wavelengths demonstrated by birefringent waveplates made of lithium niobate (LiNbO$_3$) crystal at 13.6° C. and 33.6° C. The filter's spectral response shifted by 12.18 nm.

In current filters for fiber optics dense-wavelength-division-multiplexing (DWDM) applications, the channel spacing of the filter is on the order of 1 to 4 nm or even smaller, in order to incorporate the dense optical channels. To resolve such a narrow channel spacing at a communication wavelength of 1550 nm, the optical retardance required for the waveplate is large (i.e., on the order of a few hundred wavelengths). In this case, even a small change in temperature can cause a dramatic spectral shift that off-tunes the desired pass band. For example, a 16-channel DWDM filter has a passband of about 2 nm. For a polarization filter made of LiNbO$_3$ crystals, the temperature drift factor is on the order of 0.61 nm/° C. A temperature variation of only 4° C. can cause severe problems for the passband drifting. Although a temperature control can be installed to reduce this problem. This extra temperature control is cumbersome and requires extra power consumption.

3. Solution to the Problem

The present invention uses two types of birefringent elements in the filter to solve the problem of temperature sensitivity. By using waveplates with positive and negative temperature coefficients, the thermal variations of the waveplates can be canceled and a temperature insensitive polarization filter is obtained.

SUMMARY OF THE INVENTION

This invention provides a temperature insensitive operation of a polarization filter. Two different types of birefringent elements having positive and negative thermal coefficients are inter-digitally stacked to create the polarization filter. This results in a net cancellation of the positive and negative thermal coefficients of the birefringent elements within the filter. The optical retardance of each type of birefringent element changes by an almost equal amount as the operating temperature changes, with one type of element shifting toward a larger optical retardance and the other type of element shifting toward a smaller optical retardance. However, the total retardance remains essentially constant. This assures that the filter can operate over a wide temperature range without shifting its spectral response.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1. is a graph showing the spectral responses of a polarization filter made of lithium niobate (LiNbO$_3$) crystals at 13.6° C. and 33.6° C. A spectral shift is shown toward shorter wavelengths as the temperature is increased.

FIG. 2. is a side cross-sectional view of a temperature insensitive polarization filter in accordance with the present invention.

FIG. 3a is a graph showing the spectral response of birefringent waveplates made of quartz at 22° C. and 76° C. A spectral shift is shown toward shorter wavelengths as the temperature is increased.

FIG. 3b is a graph showing the spectral response of birefringent waveplates made of polymer at 22° C. and 76° C. A spectral shift is shown toward longer wavelengths as the temperature is increased.

DETAILED DESCRIPTION OF THE INVENTION

To overcome this problem, the present invention provides temperature compensation so that the resulting filter can operate in a wide temperature range. This design is illustrated in FIG. 2. Instead of using only one type of birefringent element in the polarization filter, two different types of birefringent waveplates 10 and 20 are used. Positive and negative temperature coefficient birefringent elements 10, 20 are inter-digitally stacked together to form a composite waveplate. By designing the two materials with their net thermal coefficient closed to zero, namely, the retardance of the composite filter structure is essentially constant and a temperature insensitive polarization filter can be realized.

FIGS. 3a and 3b show the spectral responses of waveplates having positive and negative temperature coefficients. In FIG. 3a, a quartz waveplate with negative temperature coefficient of about $-8.96 \times 10^{-5}/°$ C. is measured at an optical thickness of $2.5\lambda$, where $\lambda=1550$ nm. In FIG. 3b, a polycarbonate polymer is measured under the same conditions and shows a positive temperature coefficient of $10.39 \times 10^{-5}/°$ C. In these cases, spectral shifts toward shorter and longer wavelengths, respectively, are shown in FIGS. 3a and 3b as the operating temperature is increased.

Figure 4:
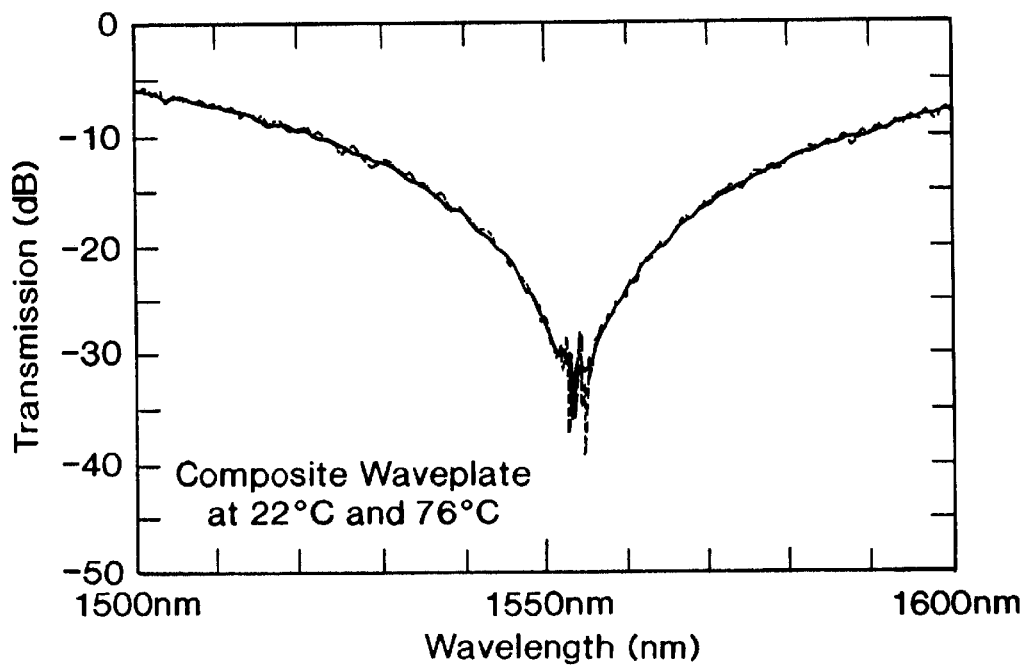
FIG. 4. is a graph showing the spectral response of a temperature insensitive waveplate having birefringent elements with positive (polymer) and negative (quartz) temperature coefficients. The spectrum remains almost unchanged from 22° C. to 76° C.
Figure 5:
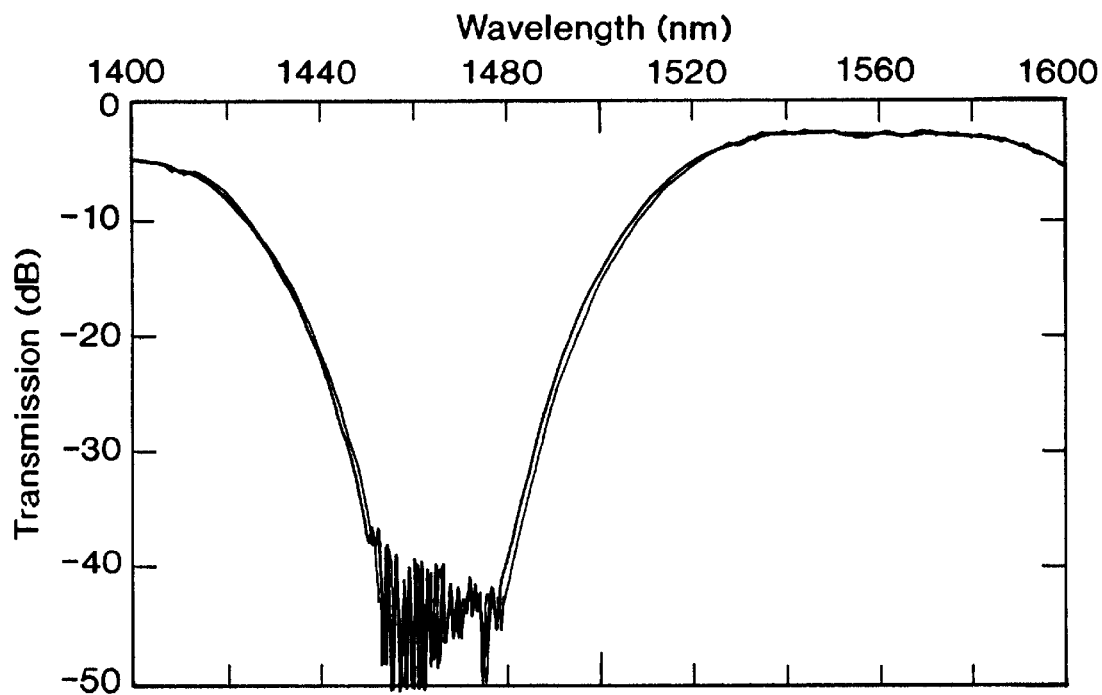
FIG. 5. is a graph showing the spectral responses of a 1310/1550 nm wavelength-division-multiplexer filter incorporating the present invention operated at 22° C. and 76° C.

By compensating the two temperature coefficients of the two optical retardance from the two materials, a temperature insensitive (athermal) waveplate can be obtained. One example that demonstrates this concept is shown in FIG. 4. Here, a quartz-based waveplate that has an optical thickness of $2.5\lambda$ is used for the negative thermal coefficient part. A polymer waveplate (e.g., polycarbonate) having an optical thickness of $2.5\lambda$ is used for the positive thermal coefficient element. In this arrangement, the total optical thickness is $5.0\lambda$ and the net temperature coefficient becomes very close to zero. The spectral response of this composite waveplate is shown in FIG. 4 for temperatures of 22 and 76° C. The spectral shift is very small and closed to zero. Based on this composite structure, the waveplates can be stacked together to form a 1310/1550 nm wavelength-division-multiplexer filter that is insensitive to temperature, as shown in FIG. 5.

In the simplest embodiment of the present invention, a filter can be made by stacking a first birefringent element having a positive temperature coefficient for optical retardance with a second birefringent element having a negative temperature coefficient for optical retardance, so that net change in optical retardance as a function of temperature is close to zero. Alternatively, a filter can be made by stacking a greater series of such birefringent elements along a common optical axis. Here again, the primary constraint is that the net change in the total optical retardance of the composite filter should be close to zero over a wide temperature range. This can be accomplished, as discussed above, by selecting waveplate thicknesses and optical materials having positive and negative temperature coefficients that result in offsetting changes in optical retardance as a function of temperature.

The above disclosure sets forth a number of embodiments of the present invention. Other arrangements or embodiments, not precisely set forth, could be practiced under the teachings of the present invention and as set forth in the following claims.

We claim:

1. A temperature insensitive polarization filter comprising:

at least one first birefringent waveplate having an optical retardance with a negative temperature coefficient; and at least one second birefringent waveplate having an optical retardance with a positive temperature coefficient that substantially offsets the change in optical retardance of said first birefringent waveplates over a range of operating temperatures;

wherein said second birefringent waveplate comprises a polymer.

2. The polarization filter of claim 1 wherein said first birefringent waveplate comprises quartz.

3. The polarization filter of claim 1 wherein said first birefringent waveplate comprises lithium niobate.

4. The polarization filter of claim 1 wherein said polymer comprises polycarbonate.

5. The polarization filter of claim 1 wherein a plurality of said first birefringent waveplates and second birefringent waveplates are alternatively stacked along an optical axis.

6. A temperature insensitive polarization filter comprising a plurality of birefringent waveplates stacked along a predetermined optical axis, including:

a first set of birefringent waveplates having an optical retardance with a negative temperature coefficient; and a second set of birefringent waveplates having an optical retardance with a positive temperature coefficient that substantially offsets the change in optical retardance of said first birefringent waveplates over a range of operating temperatures;

wherein at least one of said second set of birefringent waveplates comprises a polymer.

7. The polarization filter of claim 6 wherein at least one of said first set of birefringent waveplates comprises quartz.

8. The polarization filter of claim 6 wherein at least one of said first set of birefringent waveplates comprises lithium niobate.

9. The polarization filter of claim 6 wherein said polymer comprises polycarbonate.

10. The polarization filter of claim 7 wherein a plurality of said first birefringent waveplates and second birefringent waveplates are alternatively stacked along said optical axis.

11. A temperature insensitive polarization filter comprising:

a first set of birefringent waveplates having an optical retardance with a negative temperature coefficient; and a second set of birefringent waveplates inter-digitally stacked with said first set of birefringent waveplates along a predetermined optical axis, said second set of birefringent waveplates having an optical retardance with a positive temperature coefficient so that the total optical retardance of said first and second sets of birefringent waveplates remains substantially constant over a range of operating temperatures;

wherein at least one of said second set of birefringent waveplates comprises a polymer.

12. The polarization filter of claim 11 wherein at least one of said first set of birefringent waveplates comprises quartz.

13. The polarization filter of claim 11 wherein at least one of said first set of birefringent waveplates comprises lithium niobate.

14. The polarization filter of claim 11 wherein said polymer comprises polycarbonate.

* * * * *